(12) United States Patent
Kumar et al.

(10) Patent No.: US 8,549,300 B1
(45) Date of Patent: Oct. 1, 2013

(54) VIRTUAL SINGLE SIGN-ON FOR CERTIFICATE-PROTECTED RESOURCES

(75) Inventors: Kartik Kumar, Bangalore (IN); James Wood, Gilroy, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 485 days.

(21) Appl. No.: 12/711,094

(22) Filed: Feb. 23, 2010

(51) Int. Cl.
| H04L 9/32 | (2006.01) |
| H04L 29/06 | (2006.01) |
| G06F 7/04 | (2006.01) |
| G06F 17/00 | (2006.01) |
| G06F 12/14 | (2006.01) |

(52) U.S. Cl.
USPC ............ 713/175; 713/153; 713/168; 726/4; 726/11; 726/12; 726/23

(58) Field of Classification Search
USPC ............ 713/175, 153, 168; 726/4, 11, 12, 726/23
See application file for complete search history.

(56) References Cited

U.S. PATENT DOCUMENTS

| 7,016,875 | B1 | 3/2006 | Steele et al. | |
| 2002/0144119 | A1 | 10/2002 | Benantar | |
| 2004/0088542 | A1* | 5/2004 | Daude et al. | 713/156 |
| 2005/0021956 | A1 | 1/2005 | Genty et al. | |
| 2005/0132209 | A1* | 6/2005 | Hug et al. | 713/189 |
| 2006/0005237 | A1* | 1/2006 | Kobata et al. | 726/12 |
| 2010/0100953 | A1* | 4/2010 | Mowers et al. | 726/10 |

OTHER PUBLICATIONS

Juniper Networks Secure Access Administration Guide Release 6.5, retrieved from http://www.juniper.net/support/products/sa/6.5/ on Jan. 25, 2010, 1078 pp.

* cited by examiner

*Primary Examiner* — Aravind Moorthy
(74) *Attorney, Agent, or Firm* — Shumaker & Sieffert, P.A.

(57) ABSTRACT

In general, the invention is directed to techniques for enabling single sign-on (SSO) for a client seeking access to multiple resources protected by a certificate-based authentication scheme. For example, as described herein, a secure gateway comprises a certificate repository to store a digital certificate as well as a policy that includes one or more policy rules. A network interface of the secure gateway receives a message from a client device, wherein the message comprises a request to access a protected resource and an identifier for the requesting agent. The secure gateway also comprises a resource authentication module to map the identifier and the protected resource to the digital certificate based on the policy. The resource authentication module retrieves the digital certificate from the certificate repository and sends the digital certificate to the protected resource to authenticate the secure gateway to the protected resource.

16 Claims, 7 Drawing Sheets

VIRTUAL SINGLE SIGN-ON FOR CERTIFICATE-PROTECTED RESOURCES

TECHNICAL FIELD

The invention relates to computer networks and, more specifically, to authenticating to network resources.

BACKGROUND

Enterprises and individuals may use virtual private networks (VPNs) to communicate securely over public networks. For example, an employee of an enterprise may use a virtual private network to communicate securely over the Internet with an application server situated within the enterprise network. The use of a VPN provides assurances that others on the public network cannot intercept, read, or reuse communications sent on the VPN.

In some computing environments, an enterprise may deploy many certificate-protected resources to ensure that users attempting to access the resource are legitimate. Each of the different resources may require, for example, that the client go through a separate sign-on procedure and produce a specific digital certificate understood by that resource. For example, each certificate-protected resource may utilize a handshake protocol in which the resource responds to an access request from a client with a request for an authorizing digital certificate issued to the client by an enterprise administrator for that specific resource. Each such protected resource may require a unique certificate that is specific to both the resource and the client. As such, a certificate that grants a client access to one of the protected resources may be insufficient to provide access to a different one of the resources. Similarly, a certificate that grants a client access to a protected resource may be insufficient to provide access to the resource for a different client. When an authorized client responds to a certificate request with the appropriate authorizing certificate for the protected resource, the certificate-protected resource is able to validate the certificate. The client and protected resource then perform further aspects of the handshake protocol to authenticate one another and negotiate encryption parameters and keys for establishing a secure channel through which data can be exchanged. A client therefore must store and manage digital certificates for each of the certificate-protected resources to which it may request access.

SUMMARY

In general, the invention is directed to techniques for enabling single sign-on (SSO) for clients seeking access to an enterprise computing environment that implements a resource-specific, certificate-based authentication scheme to protect the individual enterprise resources. For example, techniques are described in which a secure VPN gateway caches resource-specific, authorizing digital certificates for clients and performs, by proxy, certain authentication functions for the clients seeking access to multiple protected resources of the enterprise.

In one example implementation, the secure gateway intermediates access requests to multiple certificate-protected resources. A client that seeks access to one of the protected resources, or an administrator, uploads the client-specific and resoursge-specific authorizing digital certificate to the secure gateway. Policies configured on the secure gateway map the certificate to the protected resource-client pair for which the certificate will be adequate to provide authorization.

When the secure gateway receives, as an intermediary, an access request to a protected resource from the client, the secure gateway authenticates and establishes a client-side secure data connection with the client using Secure Sockets Layer (SSL) or other protocol for providing secure communication channels. The secure gateway then initiates a handshake protocol with the requested resource to make an access request on behalf of the client. If the response from the protected resource includes a certificate request, the secure gateway spoofs the client by retrieving the appropriate client-specific authorizing certificate from its cache, sending the certificate to the protected resource, and authenticating itself to the protected resource to establish a resource-side secure data connection. The secure gateway then forwards data between the client and the protected resource via the client-side and resource-side secure data connections.

In one embodiment, the invention is directed to a method comprising the step of receiving, with a secure gateway device, a first message from a client device via a secure channel, wherein the first message comprises a request to access a first certificate-protected resource and an identifier for the requesting agent. The method further comprises the step of mapping, with the secure gateway device, the identifier and the first protected resource specified within the request to a first digital certificate within a certificate repository of digital certificates of the secure gateway device, wherein the digital certificates stored within the repository of the secure gateway device are specific to individual ones of a plurality of different certificate-protected resources. The method further comprises the step of sending the first digital certificate from the secure gateway device to the first certificate-protected resource.

In another embodiment, the invention is directed to a secure virtual private network (VPN) gateway comprising a certificate repository to store a plurality of digital certificates, wherein the digital certificates are specific to individual ones of a plurality of different certificate-protected resources. The secure VPN gateway further comprises a network interface to receive a first message from a client device, wherein the first message comprises a request to access a first certificate-protected resource and an identifier for the requesting agent. The secure VPN gateway further comprises a policy comprising one or more policy rules and a resource authentication module to map the identifier and the first certificate-protected resource to a first digital certificate stored by the certificate repository based on the policy, wherein the resource authentication module retrieves the first digital certificate from the certificate repository and sends the first digital certificate to the first certificate-protected resource.

In another embodiment, the invention is directed to a computer-readable medium containing instructions. The instructions cause a programmable processor to receive, with a secure gateway device, a first message from a client device via a secure channel, wherein the first message comprises a request to access a first certificate-protected resource and an identifier for the requesting agent. The instructions additionally cause the programmable processor to determine, with the secure gateway device, that the requesting agent is currently authenticated to the secure gateway device. The instructions additionally cause the programmable processor to map, with the secure gateway device, the identifier and the first protected resource specified within the request to a first digital certificate within a certificate repository of digital certificates of the secure gateway device, wherein the digital certificates stored within the repository of the secure gateway device are specific to individual ones of a plurality of different certificate-protected resources. The instructions additionally cause the programmable processor to send the first digital certificate from the secure gateway device to the first certificate-protected resource.

The techniques described herein may provide one or more advantages. For instance, because after the first access request the client is authenticated to the secure gateway, additional access requests to additional protected resources do not require re-authentication between the client and the secure gateway. As a result, the techniques provide a single sign-on (SSO) mechanism for the client, which can authenticate itself once (per session) to the secure gateway and thereby gain access to multiple resources protected by multiple different certificates. Single sign-on reduces the time required to access a resource by centralizing and automating responses to credential requests, such as requests for certificates. In addition, the techniques may relieve a user of locally storing and managing the certificates required to access the various protected resources, which provides improved mobility to a user that makes use of multiple client devices. The techniques may further relieve the user of having to select the appropriate certificate to present to a requested resource. As a still further advantage, the secure gateway provides centralized administration of authentication and authorization policies. For example, rather than distributing authorizing certificates to each client device individually, an administrator can upload all of the certificates to the secure gateway and set policies to map certificates to client-resource pairs. However, by leveraging an existing policy framework, an administrator may retain authorization control at the user level of granularity.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
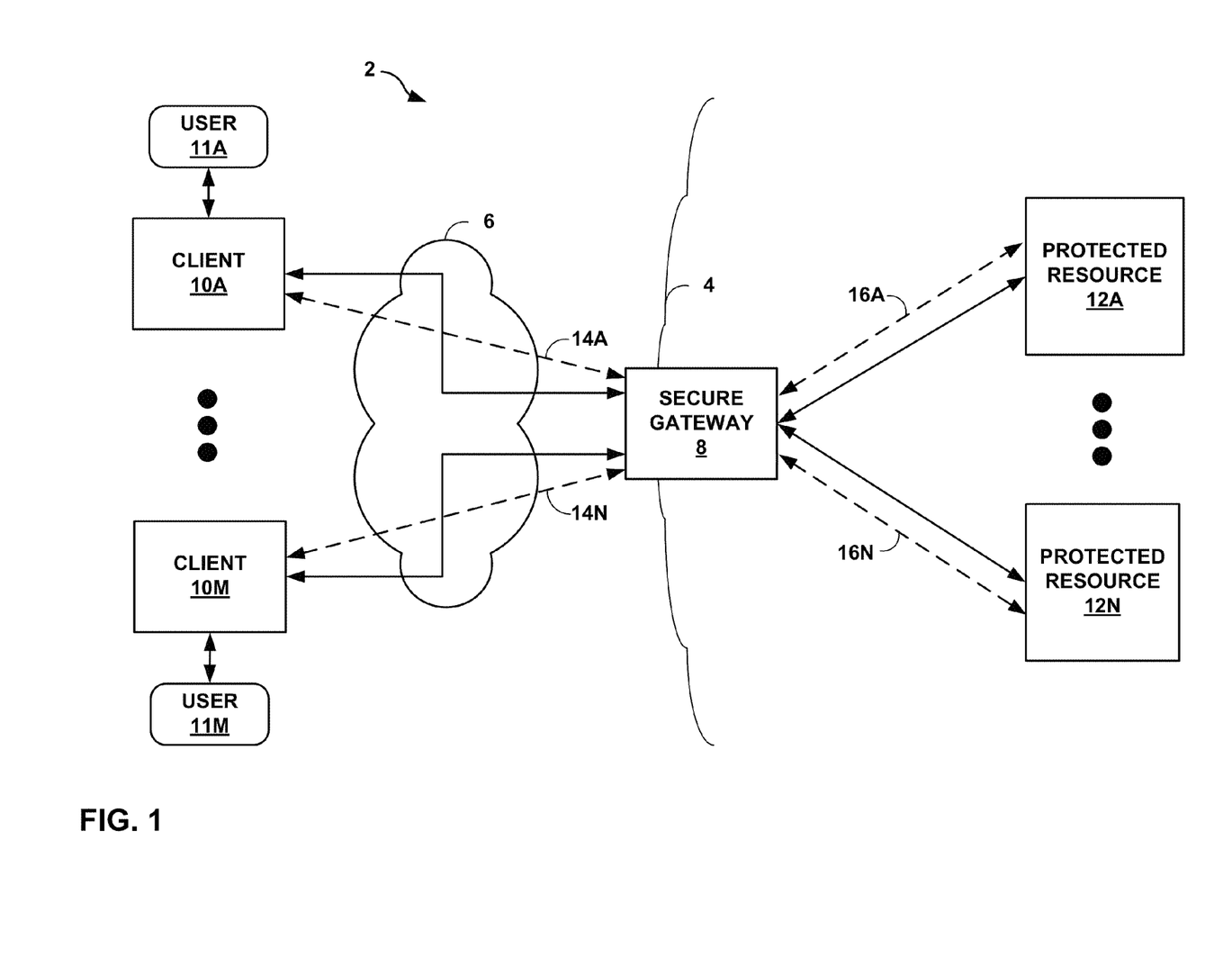
FIG. 1 is a block diagram illustrating an exemplary system in which a secure gateway stores certificates for clients and presents the certificates to protected resources in accordance with the techniques herein described.

FIG. 1 is a block diagram illustrating an example system 2 in which a secure gateway stores certificates for clients and presents the certificates to protected resources in accordance with the techniques herein described. In this example, system 2 comprises clients 10A-10M (collectively, "clients 10"), access network 6, and enterprise resource network 4. In addition, system 2 includes a secure VPN gateway 8 and protected resources 12A-12N (collectively, "protected resources 12"). Access network 6 facilitates communication between clients 10 and secure gateway 8, and resource network 4 facilitates communication between secure gateway 8 and protected resources 12. Access network 6 may be a public network (e.g., the Internet) or a private network (e.g., an enterprise network). Resource network 4 may be a private network or a sub-network within a private network that includes enhanced security features to, for instance, provide various levels of authorization to users with a base level of authorization to access network 6. Resource network 4 is protected by secure gateway 8, which enables secure and controlled access to resources provided by resource network 4. In one example, secure gateway 8 is a secure sockets layer VPN (SSL VPN) appliance that provides VPN services to clients 10. Further details on SSL VPN appliances and operations are found in "Juniper Networks Secure Access Administration Guide, Release 6.5," Juniper Networks, Inc., 2008, which is incorporated herein by reference in its entirety.

In other examples, secure gateway 8 may be, or may be operating on, an intrusion detection and prevention (IDP) system, a firewall, a unified threat management (UTM) device, a router, or other network device.

In one example, resource network 4 provides access to sensitive data and services that are accessible only to certain users 11 of access network 6. In this example, clients 10 may be personal computers associated with individual employees (users 11). The clients 10 may access resource network 4 (in this instance, a sub-network of an enterprise network "walled-off" by secure gateway 8) by authentication to secure gateway 8 and establishing a communication channel through access network 6 (in this instance, the remainder of the enterprise network). In this way, enterprise administrators may use secure gateway 8 to discriminate access to resource network 4 by individual employees based on employee authorization.

In another example, an enterprise may use system 2 to enable its employees to work remotely. In this example, clients 10 may be personal computers associated with individual employees (users 11). Users 11 may access resource network 4 (in this instance, an enterprise network) via clients 10 by authenticating to secure gateway 8 and establishing a communication channel through access network 6 (in this instance, the Internet). In this way, an enterprise using system 2 enables remote access to its electronic resources.

Each of protected resources 12 may be, for instance, a web server, an application server, a database server, a file server, an application, an employee workstation, a native messaging or email client, or other electronic resource. Users 11A-11N (collectively, "users 11") employ clients 10 to access protected resources 12. Each of clients 10 may be, for instance, a personal computer, a personal digital assistant (PDA), a smart-phone, a laptop computer, a video-game console, an application running thereon (e.g., a web browser), or other type of computing device or application that may request access to any of protected resources 12.

Each of protected resources 12 is protected by a security scheme that requires a device requesting access to present an authorizing token. In the example of system 2, protected resources 12 require receipt of an authorizing digital certificate as a condition of granting access to a requesting device. Protected resources 12 may have divergent security requirements and mechanisms. For example, protected resource 12A may only accept certificates signed by a particular certificate authority (CA), while protected resource 12N only accepts certificates signed by a different CA. As another example, protected resources 12 may require certificates corresponding to various certificate classes or formats. For example, protected resource 12A may only accept certificates having class 4 or higher.

Secure gateway 8 intermediates access by clients 10 to protected resources 12. In one example, secure gateway 8 terminates incoming access requests and connections at the application layer. In this example, clients 10 and protected resources 12 are never directly connected on any layer of the Open System Interconnection (OSI) reference model or of the TCP/IP model. Rather, secure gateway 8 operates as an application layer proxy to protect protected resources 12 from direct exposure to access network 6. Secure gateway 8 receives incoming access requests from clients 10 encapsulated in a packet, decapsulates the access requests to reach the underlying application data, and sends the application data comprising the access requests to requested protected resources 12.

In another example, secure gateway 8 allows direct connections between layers of the OSI reference model or of the TCP/IP model. In this example, secure gateway 8 exchanges data using a secure channel negotiated with the requesting one of clients 10. Secure gateway 8 receives a secure request from the requesting client 10 via the secure channel and makes requests to the appropriate one of protected resources 12 on behalf of the requesting client to establish a data connection between the requesting client 10 and the requested protected resource 12.

To access protected resources 12 within resource network 4, a user 11 directs an associated client 10 to establish a data connection 14 to secure gateway 8. Each of data connections 14 may comprise, for example, a Transmission Control Protocol (TCP) session, a User Datagram Protocol (UDP) session, a VPN tunnel, a VLAN, or other communication session. In some instances, each of data connections 14 is a secure data connection conforming to a security scheme, such as Secure Sockets Layer (SSL) or Transport Layer Security (TLS). Users 11 provide credentials to secure gateway 8 to establish one-way authentication and authorization. Credentials may include, for example, a username-password pair, a biometric identifier, a data stored on a smart card, or a one-time password token. In some examples, the clients 10 initiate access requests to protected resources 12 and automatically authenticate to secure gateway 8. In other words, both clients 10 and users 11 may be the requesting agent.

Based on the provided credentials, secure gateway 8 authorizes or denies access to resource network 4 to users 11. For additional security, clients 10 may require authentication by secure gateway 8 to establish two-way authentication and authorization. In some examples, the client 10 and secure gateway 8 exchanges public key certificates issued by a mutually-trusted third party. Client 10 and secure gateway 8 may also negotiate other aspects of data connection 14 that ensure security, including the type/version of an encryption algorithm, and symmetric keys for encrypting/decryption data transported via data connection 14.

Secure gateway 8 may use an authentication, authorization and accounting (AAA) server to authenticate the credentials provided by clients 10. The AAA server may execute on secure gateway 8 or on a separate network device and may be, for example, a Remote Authentication Dial-In User Service (RADIUS) server.

Secure gateway 8 establishes secure data connections 16 with protected resources 12 to facilitate access, by clients 10, to the resources. Each of data connections 16 is a secure data connection conforming to a security scheme, such as Secure Sockets Layer (SSL) or Transport Layer Security (TLS).

In accordance with the techniques herein described, secure gateway 8 spoofs the identity of clients 10 to authenticate itself and, by extension, clients 10 to protected resources 12, thereby enabling single sign-on (SSO) for users 11 of clients 10. Secure gateway 8 caches digital certificates and private keys associated with each of clients 10 and includes a mapping of the associations between certificates/keys, users 11, and protected resources 12. The mapping determines, for secure gateway 8, the particular certificate to present to the one of protected resources 12 to which one of users 11 requests access. In other words, secure gateway 8 maps stored certificates to a [user 11, protected resource 12] pair. In some instances, the mapping is keyed according to a [client 10, protected resource 12] pair. In some instances, the mapping is keyed according to a [user 11, client 10, protected resource 12] tuple.

In one example, user 11A directs client 10A to access protected resource 12A via secure gateway 8. For instance, user 11A may use a web browser running on client 10A to request a web page served by protected resource 12A. After establishing data connection between client 10A and secure gateway 8, as described above, secure gateway 8 initiates a handshake protocol with protected resources 12A. Secure gateway 8 sends a client hello message that comprises encryption session negotiation parameters, such as a protocol type/version, session ID, cipher suite, compression method, and initial random numbers, as well as a request for a server certificate that secure gateway 8 can use to authenticate protected resource 12A. Protected resource 12A responds with a server hello message that comprises a certificate, as well as a request for a client certificate that protected resource 12A can use to authenticate secure gateway 8 (acting in the guise of client 10A). In some instances, the client hello message does not comprise a certificate request. In such instances, the server hello message does not then include the server certificate the secure gateway 8 does not authenticate protected resource 12A.

Secure gateway 8 verifies that the server certificate is valid and issued by a trusted CA to authenticate protected resource 12A. In some examples, this step may include decrypting a digital signature, received from protected resource 12A, using the public key of the server certificate, calculating a digital signature, and comparing the decrypted digital signature to calculated digital signature. In some examples, secure gateway authenticates protected resource 12A based on the server certificate in another manner, for example, a part of a key exchange.

In addition, according to the described techniques, secure gateway 8 maps the [user 11A, protected resource 12A] pair to one of the stored certificate-private key pairs. Secure gateway 8 sends the mapped certificate to protected resource 12A in response to the certificate request along with key exchange parameters. Protected resource 12A receives the certificate and key exchange parameters and verifies that the certificate is valid and issued by a trusted CA. Protected resource 12A uses the certificate to authenticate secure gateway 8. In some instances, receiving a valid certificate issued by a trusted CA is sufficient. In some embodiments, secure gateway 8 may send a certificate verify message that includes a hash based on preceding handshake message parameters and signed by the private key associated with the certificate sent to protected resource 12A. This message enables protected resource 12A to verify that secure gateway 8 owns the private key associated with the certificate. Protected resource 12A decrypts the signed hash using the public key of the user 11A certificate, calculates a hash based on preceding handshake message parameters and compares the decrypted hash to the calculated hash. Matching hashes authenticates secure gateway 8 to protected resource 12A. Protected resource 12A then sends the requested resource data to client 10A via secure data connection 16A and secure gateway 8.

Authenticating secure gateway 8 in this manner does not require any additions or alterations to protected resource 12A. From the perspective of protected resource 12A, it is communicating with client 10A and user 11A. In addition, because secure gateway 8 and protected resource 12A have authenticated each other in this example, secure data connection 16A is established based on two-way authentication.

Secure gateway 8 and protected resource 12A may, in some examples, exchange key exchange parameters to compute a key (e.g., a symmetric key) for encrypting messages sent via secure data connection 16A. The key exchange parameters may be, for example, an RSA pre-master secret encrypted with the public key of the certificate received from protected resource 12A, public Diffie-Hellman parameters or a public key for client 10A, or Fortezza parameters. In this example, secure gateway 8 and protected resource 12A use the computed key and encryption algorithms to create an encrypted tunnel through which data may pass securely over secure data connection 16A.

While still authenticated to secure gateway 8 through client 10A, user 11A may further direct client 10A to access protected resource 12N via secure gateway 8. Secure gateway 8 determines that user 11A remains authenticated. User 11A does not, therefore, need to again provide credentials to secure gateway 8 for authentication. Instead, secure gateway 8 establishes a second secure data connection 16N to protected resource 12N in the manner described above with respect to secure data connection 16A to protected resource 12A. Specifically, according to the described techniques, secure gateway maps the [user 11A, protected resource 12N] pair to a second one of the stored certificate-private key pairs and sends the second certificate to protected resource 12N to authenticate secure gateway 8 to the resource. In some instances, [user 11A, protected resource 12A] pair and [user 11A, protected resource 12N] pair map to the same certificate.

By leveraging already established data connection 14A to facilitate access to protected resource 12N according to the described techniques, secure gateway 8 offers an SSO service to user 11A. In other words, user 11A is able to access protected resource 12N without having to again provide credentials to authenticate to secure gateway 8. In addition, the techniques described enable this SSO service without requiring any modifications to protected resources 12, such as installation of an SSO client or changes to an authentication protocol.

Figure 2:
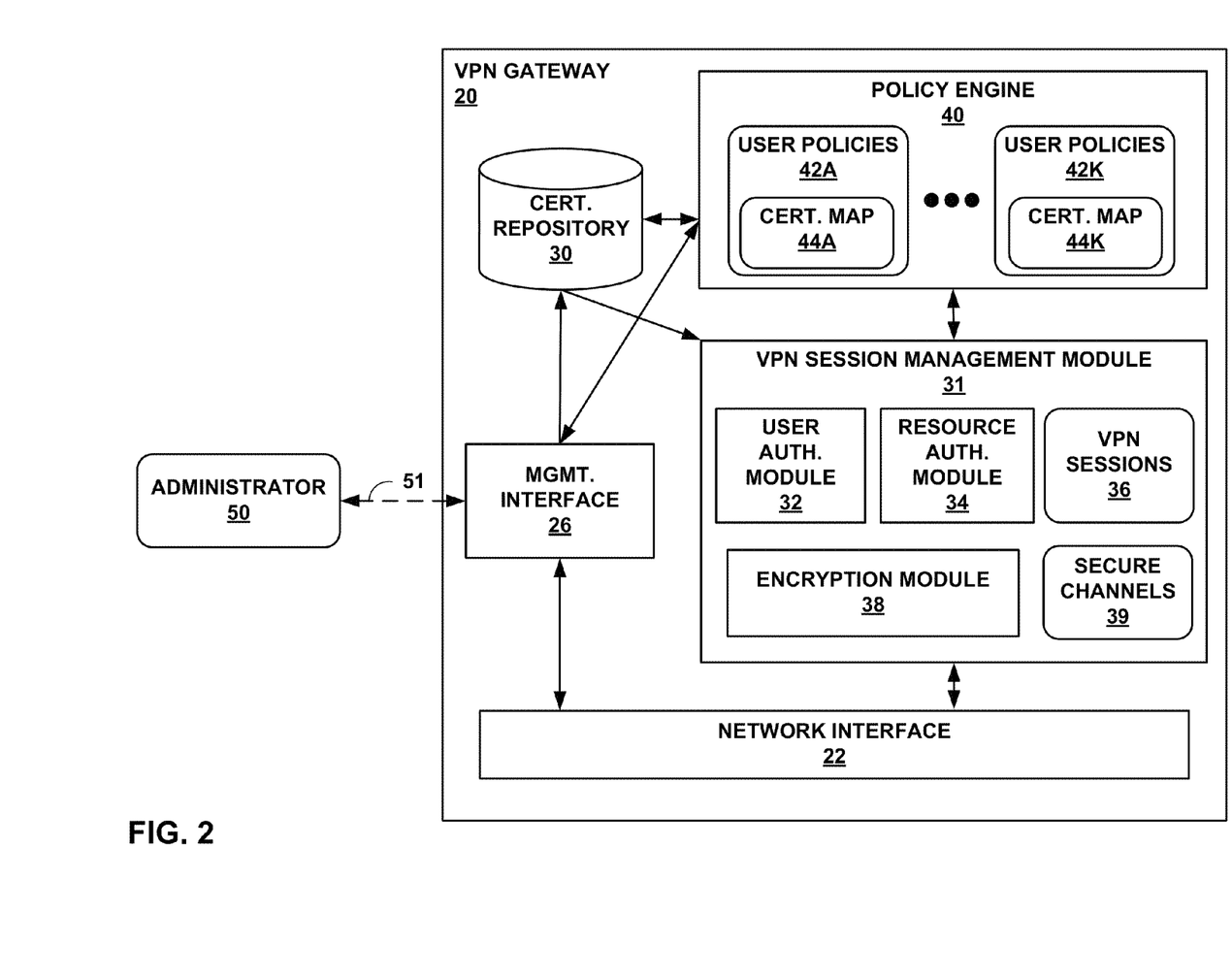
FIG. 2 is a block diagram illustrating an exemplary secure gateway that performs the proxy authentication techniques herein described.

FIG. 2 is a block diagram illustrating an example VPN gateway 20, which extends a protected scope of a protected network to remote users by authenticating the remote users and, in some instances, establishing a secure data connection to the remote user devices. VPN gateway 20 is an exemplary embodiment of secure gateway 8 of FIG. 1 and comprises VPN session management module 31, network interface 22, and policy engine 40. In some embodiments, VPN gateway 20 is an SSL VPN or a TLS VPN.

Network interface 22 sends and receives network packets to facilitate communication between VPN gateway 20 and other network devices, including clients 10 and protected resources 12. Network interface 22 may be a wired or wireless interface, such as an Ethernet, fiber optic, token ring, modem, or other network interface.

VPN session management module 31 provides virtual private networking capabilities to remote users of a protected network. VPN session management module 31 authenticates clients 10 to facilitate access requests by the clients to resource network 4 and additionally provides authentication of clients 10 to protected resources 12 within resource network 4.

VPN session management module 31 comprises user authentication module 32 and VPN sessions 36. VPN sessions 36 is a data structure that stores and maintains VPN session data for various VPN sessions created and administered by VPN session management module 31. VPN session data may include, for example, information regarding VPN tunnels, endpoint addresses, access control, security levels, and encryption information.

In response to an initial request for access to a protected resource 12, user authentication module 32 requests and receives, via network interface 22, credentials from the requesting one of users 11, e.g., user 11A. User authentication module 32 validates the credentials to authenticate user 11A and directs VPN session management module 31 to create a VPN session for user 11A. VPN session management module 31 creates the VPN session for user 11A and adds the session to VPN sessions 36. Thereafter, VPN gateway 20 and user 11A (via client 10A) communicate using the VPN session. In some embodiments, client 10 autonomously requests access. In such embodiments, user authentication module 32 requests clients 10 to self-authenticate. In some embodiments, user authentication module 32 authenticates users 11 or clients 10 by employing a RADIUS or other AAA server.

VPN session management module 31 further comprises encryption module 38 and secure channels 39. Encryption module 38 enables and executes an encryption scheme for securing data connections. Encryption module 38 may implement, for example, SSL, TLS, or another method for securing data connections to form one or more secure channels 39 between VPN gateway 20 and other network devices.

In some instances, VPN session management module 31 directs encryption module 38 to create and maintain one or more secure channels 39 for one or more VPN sessions 36 with various users 11. For example, encryption module 38 may establish an SSL channel for a VPN session 36 between user 11A and VPN gateway 20. In this example, therefore, a VPN tunnel for the VPN session transports application data encrypted by encryption module 38 according to the established SSL channel. Each of secure channels 39 may be established according to one-way or two-way authentication.

VPN gateway 20 additionally comprises certificate repository 30 and policy engine 40. Certificate repository 30 stores digital certificates that VPN gateway 20 can use to authenticate to protected resources 12. Digital certificates stored by certificate repository 30 may include X.509 certificates or other public-key certificates that bind a public key to an identity. Each of the digital certificates may have a different certificate class corresponding to the strength of the security provided by the certificate. Digital certificates may comprise a certificate chain anchored by a CA or, in a web of trust scheme, may be self-signed or endorsed.

In some examples, certificate repository 30 also stores an associated private key for each digital certificate. The associated private key decrypts messages encrypted by the public key of the digital certificate, and vice-versa.

Certificate repository 30 may comprise a data structure that keys the storage locations of stored certificates by certificate name or other identifier. Certificate repository 30 responds to a certificate request that includes the certificate name by keying the certificate name to the storage location of the requested certificate, retrieving the certificate at the storage location, and returning the retrieved certificate to the requesting module.

Certificate repository 30 comprises computer readable storage media that includes volatile and/or non-volatile, removable and/or non-removable media implemented in any method or technology for storage of digital information. Computer readable storage media includes random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the digital certificates and, in some examples, associated private keys. In some embodiments, for additional security and data integrity, certificate repository 30 is a cryptographic storage device. For example, certificate repository 30 may be a secure hard drive or flash drive dedicated as a certificate repository for VPN gateway 20.

Policy engine 40 is a decision engine that defines behaviors of VPN gateway 20 with regard to, for example, security, user access, traffic handling, and other area. Policy engine 40 includes policy data in the form of policy rules. In general, a policy rule specifies an action that policy engine 40 is to take on occurrence of some condition in VPN gateway 20. Policy rules may be expressed as conditional statements. Policy engine 40 comprises user policies 42A-42K (collectively, "user policies 42") that each correspond to a different one of users 11. For example, user policy 42A may correspond to user 11A of FIG. 1. User policies 42 comprise policy rules specific to the corresponding one of users 11. As one example, user policy 42A may specify that traffic receives from user 11A should be dropped.

Each of user policies 42 comprises a respective one of certificate maps 44A-44K (collectively, "certificate maps 44"). In example VPN gateway 20, each of certificate maps 44 comprises a list of one or more policy rules that map one or more certificates stored by certificate repository 30 to the associated one of users 11. The certificates mapped may be identified, for example, by name or by location in certificate repository 30. On the occurrence of an access request by one of users 11, policy engine 40 may be directed to query the associated one of certificate maps 44 for that user to obtain the appropriate certificate. In some instances, certificate maps 44 associate with clients 10 rather than users 11.

Each of certificate maps 44 includes multiple such policy rules that are differentiated by an identifier, e.g., a server name or address, for one of protected resources 12 and by the certificate mapped. As a result, each of certificate maps 44 keys [user 11, protected resource 12] pairs to a particular certificate. For example, certificate map 44A may include two policy rules: a first rule that maps a first certificate to protected resource 12A and a second rule that maps a second certificate to protected resource 12B. Both the first and second rules are also implicitly keyed by user 11A because certificate map 44A is associated with user 11A. In some embodiments, certificate maps 44 comprise a single data structure, such as a database, a table, a hash table, or other data structure useful for mapping a certificate to a [user 11, protected resource 12] key pair.

VPN session management module 31 further comprises resource authentication module 34 to authenticate VPN gateway 20 to protected resources 12. In response to receiving an access request to one of protected resources 12, VPN session management module 31, after establishing a VPN session with the requesting user, directs resource authentication module 34 to establish a secure channel with the requested protected resource 12. Resource authentication module 34 cooperates with encryption module 38 to establish one of secure channels 39 to enable communication with requested protected resource 12. As one example, encryption module 38 and resource authentication module 34 may cooperate to establish an SSL channel between VPN gateway 20 and protected resource 12A to facilitate access by user 11A.

As an aspect of establishing a secure channel, resource authentication module 34 receives a certificate request from the protected resource 12 for which access is sought. In response, resource authentication module 34 spoofs the cryptographic identity of user 11 to enable communication between VPN gateway 20 and the requested protected resource 12. Specifically, resource authentication module 34 determines and returns the certificate mapped to the requested protected resource 12 based on the associated certificate map 44 for requesting user 11.

As one example, user 11A requests access to protected resource 12A. During a protocol handshake to establish a secure channel, resource authentication module 34 receives a certificate request message from protected resource 12A. Resource authentication module 34 directs policy engine 40 to query certificate map 44A (associated with user 11A) for the appropriate certificate to present in response to the certificate request. Policy engine 40 determines the appropriate certificate from certificate map 44A based on an identifier for protected resource 12A. Policy engine 40 returns an identifier for the certificate to resource authentication module 34, which retrieves the certificate from certificate repository 30 and forwards the certificate to protected resource 12A to further the authentication process.

In addition, resource authentication module 34 may send a certificate verify message that includes a hash based on preceding handshake message parameters and signed by the private key corresponding to the public key of the certificate sent to protected resource 12A.

Encryption module 38 completes the additional steps necessary to establish a secure channel 39 to protected resource 12A. As a result, VPN gateway 20 may now forward data received via one of secure channels 39 with protected resource 12A to client 10A via one of VPN sessions 36 with client 10A. The VPN session for client 10A may include another one of secure channels 39.

VPN session management module 31 handles additional access requests to protected resources 12 from one of users 11 that has already established a VPN session. In such instances, resource authentication module 34 and encryption module 38 again cooperate to establish a secure channel to the additionally requested protected resource 12. Resource authentication module 34 obtains the appropriate certificate based on the associated certificate map 44 for the requesting user 11 and forwards the certificate to the protected resource 12. The techniques herein described thus allow the requesting user 11 to access multiple ones of protected resources 12 by establishing a single VPN session with VPN gateway 20. In other words, the described techniques enable SSO for users 11.

VPN gateway 20 further comprises management interface 26 to expose methods that enable administrator 50 to configure user policies 42 and other aspects of VPN gateway 20. Administrator 50 connects to management interface 26 via communication link 51, which may comprise network links and/or local links, including links to computer peripherals. In accordance with the described techniques, management interface 26 provides an interface with which administrator 50 can upload digital certificates and associated private keys to certificate repository 30. In addition, management interface 26 enables administrator 50 to add, modify, or delete certificate mappings in certificate maps 44.

For example, administrator 50, via management interface 26, may upload an updated certificate that is associated with user 11A and that is capable of authenticating user 11A to protected resource 12A. Administrator 50 therefore also modifies the rule in certificate map 44A keyed to protected resource 12A to cause the rule to map to the newly uploaded certificate.

In some instances, users 11 self-administer certificates and certificate relationships with regard to VPN gateway 20. That is, users 11 may perform the functions described above with respect to administrator 50 to enable SSO to protected resources 12 via VPN gateway 20 according to the techniques herein described. In some embodiments, management interface 26 monitors certificate repository 30 for expired certificates or certificates with a pending expiration. Management interface 26 notifies the associated user 11 regarding such a certificate to prompt renewal of the certificate.

Figure 3:
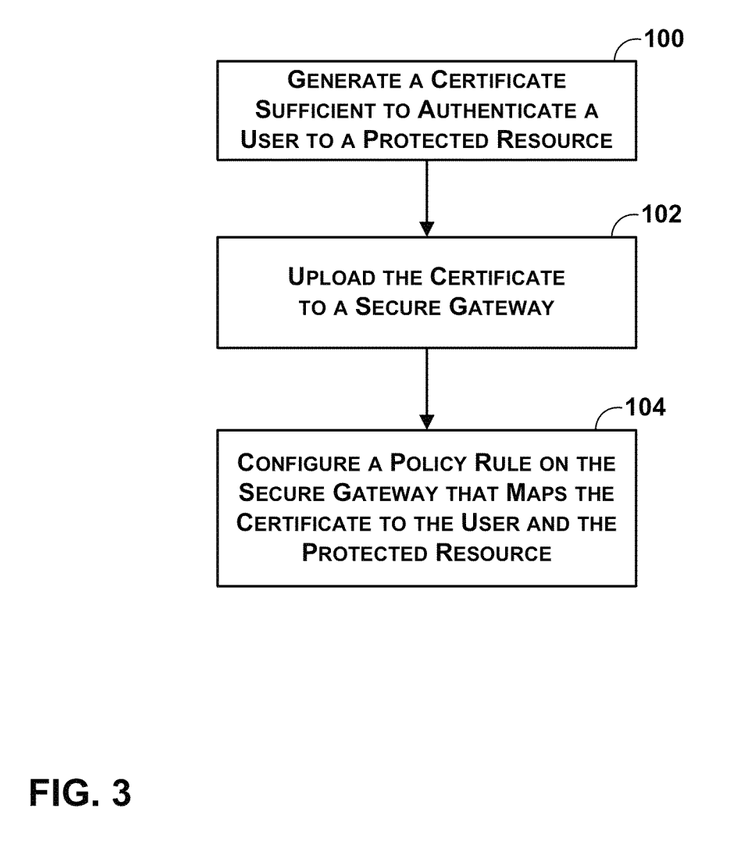
FIG. 3 is a flow chart illustrating an example certificate and policy configuration operation for the exemplary secure gateway according to the techniques herein described

FIG. 3 is a flow chart illustrating an example certificate and policy configuration operation of VPN gateway 20, an exemplary instance of secure gateway 8, according to the techniques herein described. Initially, an agent, such as an administrator, a user, or a software agent, generates a digital certificate for user 11A (in some instances, client 10A) that protected resources 12A accepts as sufficient to authenticate user 11A during a handshake protocol operation to establish a secure channel (100). Via management interface 26, the agent uploads the certificate to VPN gateway 20 (102), which stores the certificate to certificate repository 30. The agent then, again using management interface 26, adds a policy rule or configures an existing policy rule in certificate map 44A to map the newly uploaded certificate to protected resource 12A (104). Because certificate map 44A is associated with user 11A, this policy rule effectually maps the newly uploaded certificate to both user 11A and protected resource 12A.

Figure 4:
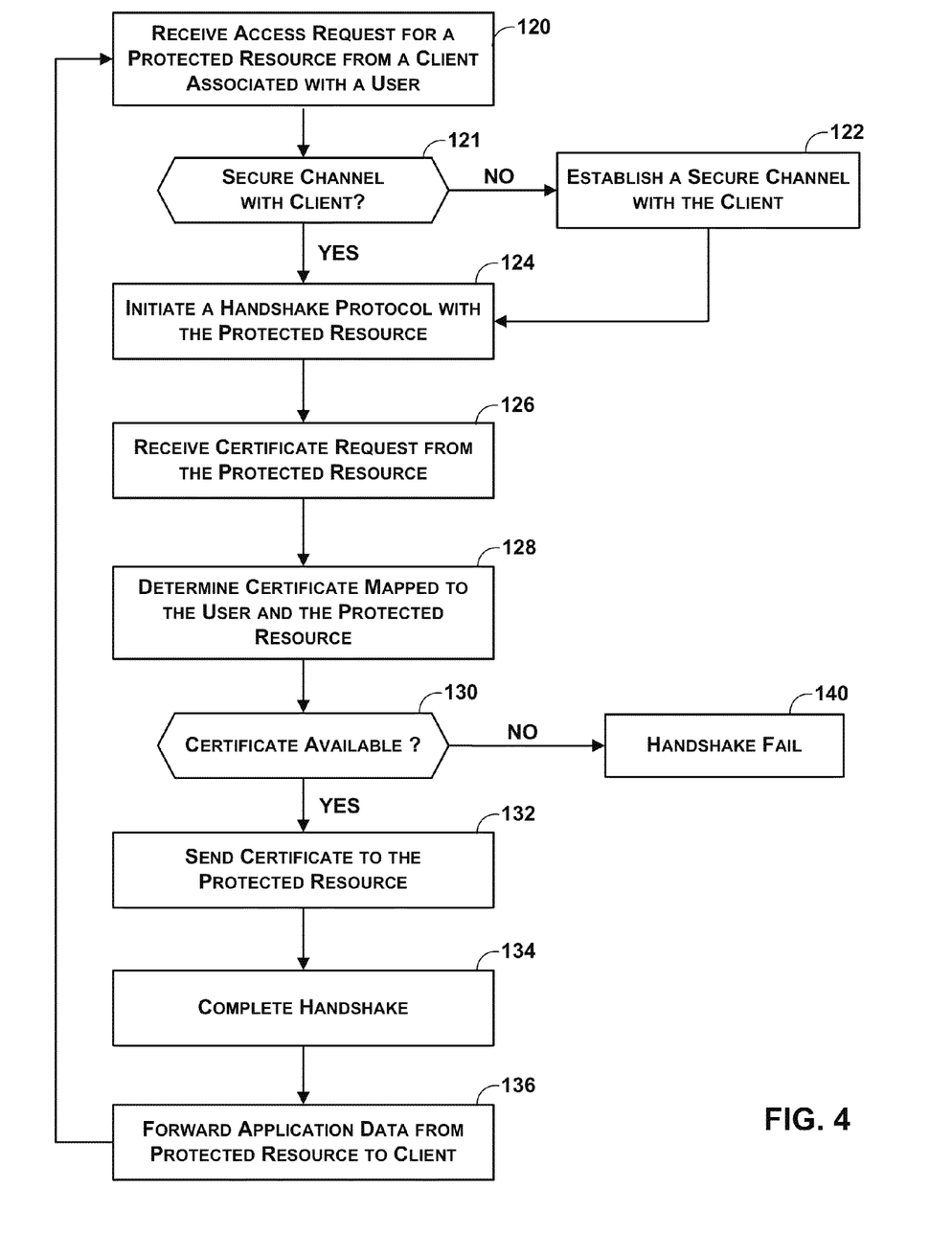
FIG. 4 is a flowchart illustrating an example operation of the exemplary secure gateway for performing single sign-on (SSO) for a user according to the described techniques.

FIG. 4 is a flowchart illustrating an example operation of VPN gateway 20 for performing single sign-on (SSO) for a user according to the described techniques. VPN gateway 20 receives a message from client 10A, associated with user 11A, that requests access to protected resource 12A (120). The message may comprise, for instance, a request for a data service, a page request comprising a Uniform Resource Locator (URL) for a web page served by protected resource 12A, a file request, or other service from protected resource 12A.

If a secure channel (e.g., an SSL channel) between VPN gateway 20 and client 10A does not exist (NO branch of 121), VPN gateway 20 establishes a secure channel with client 10A (122). After establishing a secure channel with client 10A, or if such a secure channel already exists (YES branch of 121), VPN gateway 20, to establish a secure channel, initiates a handshake protocol with protected resource 12A (124). During execution of the handshake protocol, VPN gateway 20 receives a certificate request from protected resource 12A (126), prompting VPN gateway 20 to authenticate itself.

In response to the certificate request, resource authentication module 34 of VPN gateway 20 queries policy engine 40 to determine a certificate mapped to the [user 11A, protected resource 12A] key pair and to return an identifier for the certificate for retrieval from certificate repository 30 (128). If such a certificate mapping does not exist, or if the certificate is missing, corrupted, or otherwise unavailable (NO branch of 130), the handshake fails (140) and VPN gateway 20 may return a failure message to protected resource 12A. Upon successfully determining a mapped certificate however (YES branch of 130), resource authentication module 34 of VPN 20 reads and sends the mapped certificate to protected resource 12A (132). VPN gateway 20 continues the handshake protocol with protected resource 12A to establish the secure channel (134). VPN gateway 20 forwards application data or other service-related data from protected resource 12A to client 10A once the secure channel is established (136). VPN gateway 20 may receive additional requests from the client for access to other ones of protected resources 12, which VPN gateway 20 also handles in the manner described.

Figure 5:
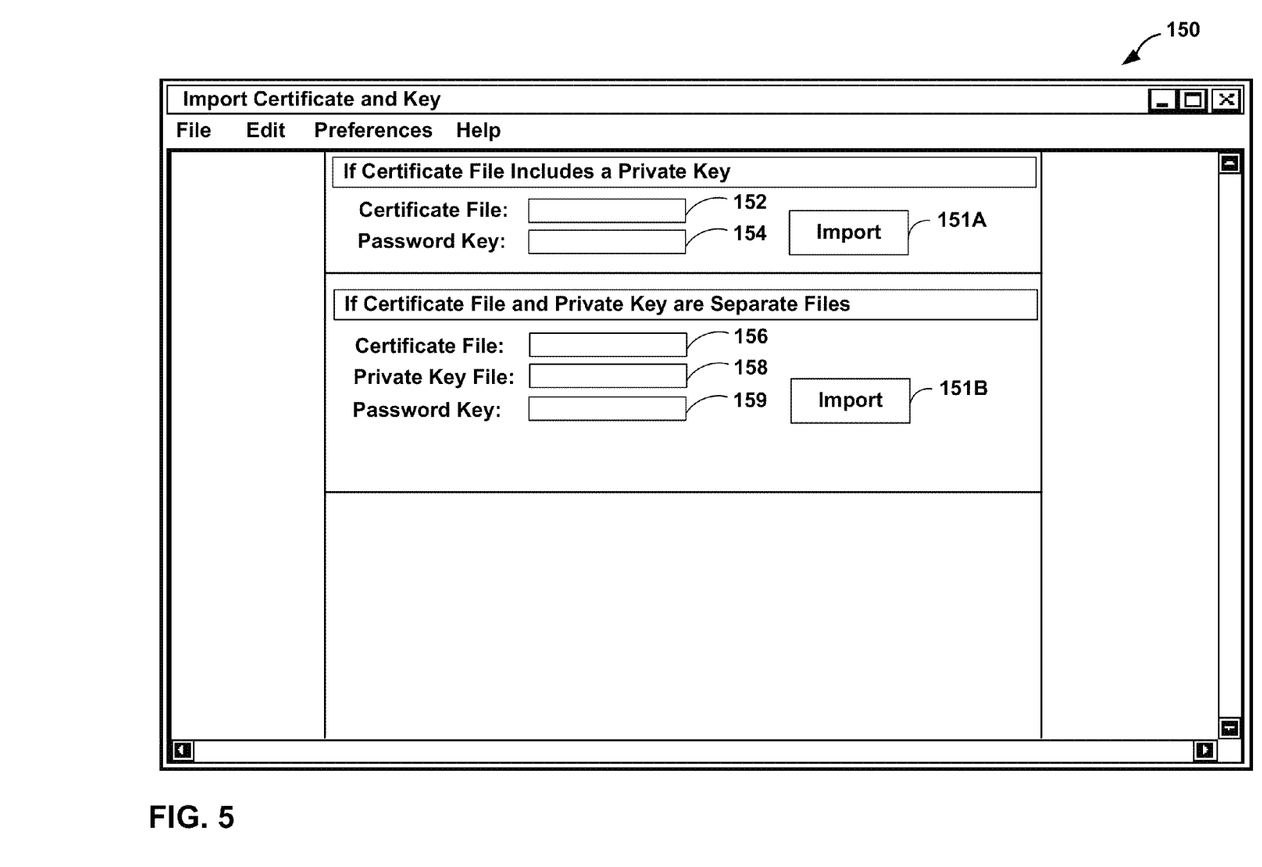
FIG. 5 is a screenshot showing an aspect of an example management interface of the exemplary secure gateway.

FIG. 5 is a screenshot 150 showing an aspect of exemplary management interface 26 of VPN gateway 20 for uploading certificates to VPN gateway 20. Screenshot 150 may illustrate a client-side interface of management interface 26 operating on an administrative device.

Management interface 26 comprises textboxes 152, 154, 156, and 158 for specifying file locations of files, textboxes 154 and 159 for specifying passwords for password-protected files, and import buttons 151A-151B. Files specified may be local or remote. Using management interface 26, administrator 50 specifies the location of a certificate file in either textbox 152 or textbox 156. If the certificate and the private key associated with the certificate are located in separate files, administrator 50 additionally specifies the location of the private key file in textbox 158. If the files specified are password-encrypted, administrator 50 enters the password in either textbox 154 or textbox 159. After specifying the files to upload and the optional password key, administrator 50 presses the appropriate one of import buttons 151A-151B. Management interface 26, if necessary, decrypts the specified files using the supplied password. Management interface 26 then uploads the files to certificate repository 30.

Figure 6:
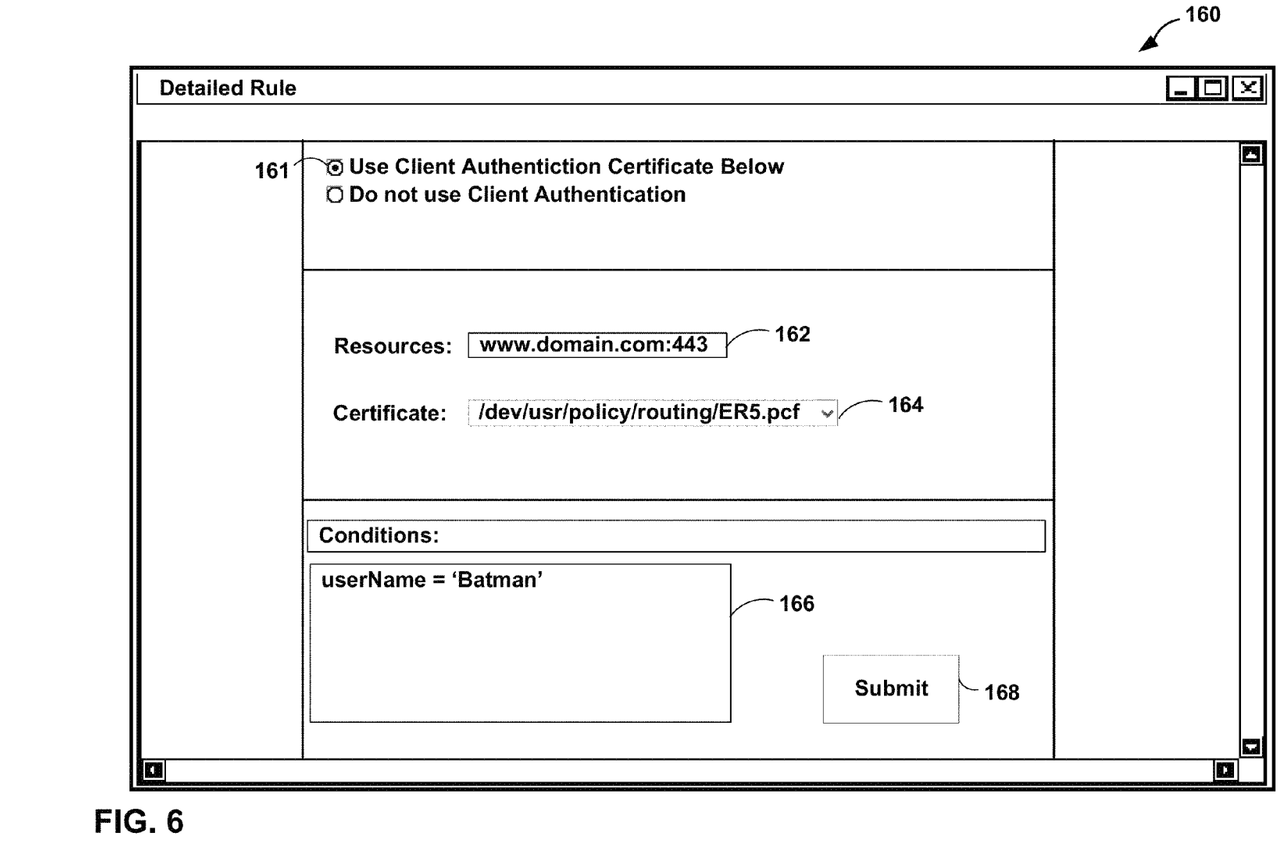
FIG. 6 is a screenshot showing another aspect of the example management interface of the exemplary secure gateway.

FIG. 6 is a screenshot 160 showing an aspect of exemplary management interface 26 of VPN gateway 20 for adding and configuring policy rules to map certificates to users 11 and resources 12. Screenshot 160 may illustrate a client-side interface of management interface 26 operating on an administrative device.

Management interface 26 comprises radio button 161, textboxes 162 and 166, drop-down list 164, and submit button 168. Using management interface 26, administrator 50 selects radio button 161 to indicate that a policy rule is to specify use of a particular certificate for one of users 11. Administrator 50 creates the policy rule mapping by specifying, in textbox 162, resources to which the rule applies. In example management interface 26, resources may be identified in textbox 162 by URL, IP address, and IP address:TCP Port combinations. Administrator 50 selects the certificate mapped to the resources identified in textbox 162 using drop-down list 164. Finally, administrator 50 may identify one or more users 11 to which the certificate is mapped in textbox 166. The mapping thus specifies a certificate that VPN gateway 20 is to present to a particular one of resources 12 to facilitate an access request from a particular one of users 11. Administrator 50 presses submit button 168 to set the policy rule for VPN gateway 20 as entered. Example screenshot 160 illustrates a policy rule that directs VPN gateway 20 to present certificate 'Batman' to a protected resource 12 identified as 'www.domain.com:443' when the requesting user 11 is 'Batman'. Certificate and user 11 identities need not be identical, however.

Figure 7:
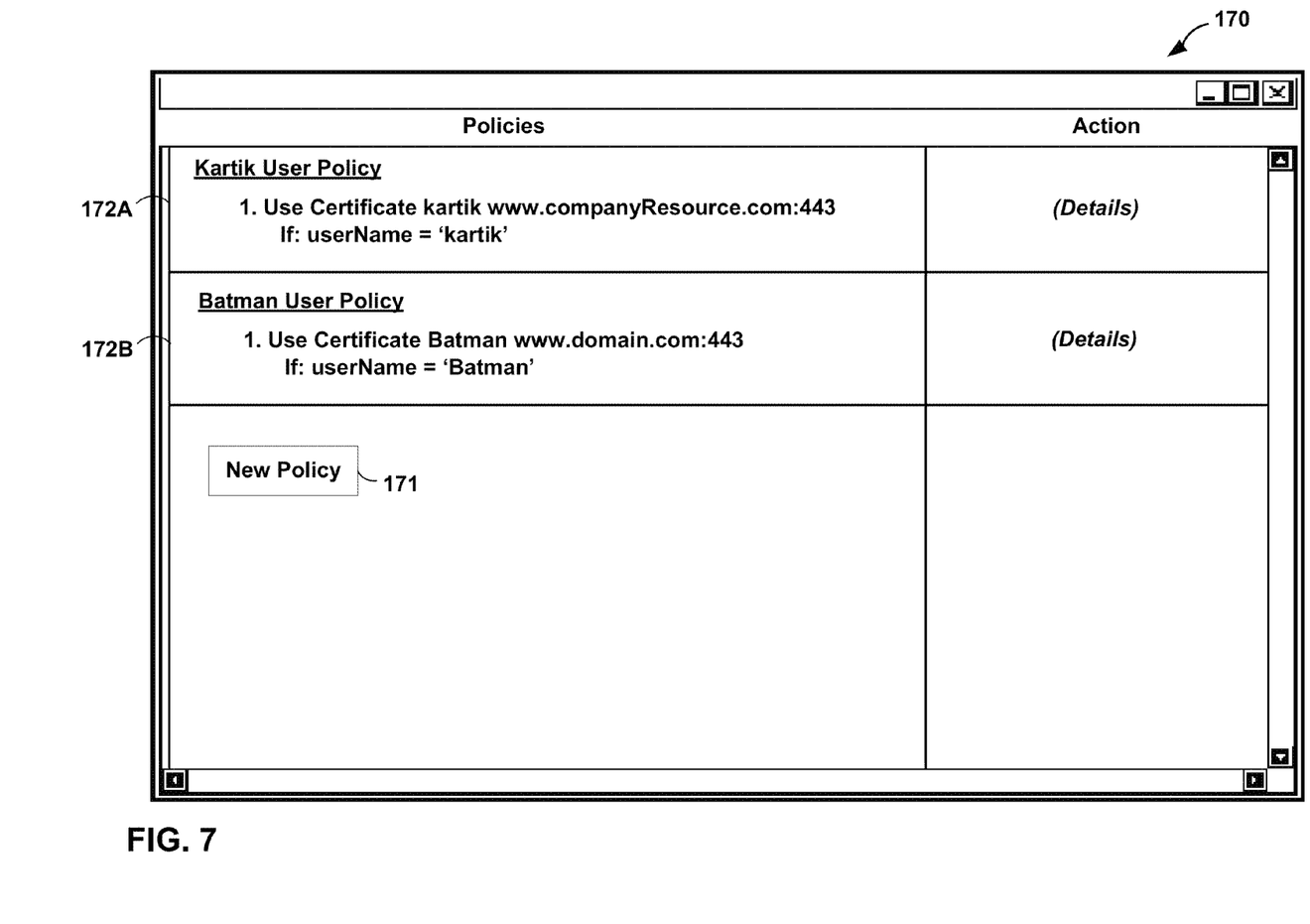
FIG. 7 is a screenshot showing another aspect of the example management interface of the exemplary secure gateway.

FIG. 7 is a screenshot 170 showing an aspect of exemplary management interface 26 of VPN gateway 20 for viewing elements of certificate maps 44 and initiating new certificate mappings. Management interface 26 comprises new policy button 172 and illustrates certificate maps 172A-172B. New policy button 172 causes management interface 26 to present the aspect shown by screenshot 160 of FIG. 6, which enables administrator 50 to create new certificate mappings. Illustrated certificate map 172A-172B show exemplary details for certificate mappings to various combinations of protected resources 12 and users 11.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals or carrier waves, although the term "computer-readable media" may include transient media such as signals, in addition to physical storage media.

Various embodiments of the invention have been described. These and other embodiments are within the scope of the following claims.

The invention claimed is:

1. A method comprising:
receiving, with a secure gateway device that provides secure access to a resource network comprising a plurality of different certificate-protected resources, a first message from a client device coupled to the secure gateway device through an access network, wherein the first message comprises a request to access a first certificate-protected resource and an identifier for a user that is associated with the client device;
in response to receiving the first message with the secure gateway device, initiating a protocol handshake between the secure gateway device and the first certificate-protected resource to establish a secure channel;
mapping, with the secure gateway device, the identifier and the first certificate-protected resource specified within the request to a first digital certificate within a certificate repository of digital certificates of the secure gateway device, wherein the digital certificates stored within the repository of the secure gateway device are specific to individual ones of the plurality of different certificate-protected resources;
receiving, with the secure gateway device, a certificate request from the first certificate-protected resource as part of the protocol handshake;
in response to receiving the certificate request, sending the first digital certificate from the secure gateway device to the first certificate-protected resource via the resource network to authenticate the secure gateway device to the first certificate-protected resource on behalf of the client device; and
subsequent to authenticating the secure gateway device to the first certificate-protected resource, forwarding application data received with the secure gateway device from the first certificate-protected resource to the client device via the access network.

2. The method of claim 1, wherein the secure channel comprises a secure sockets layer tunnel.

3. The method of claim 1, wherein the protocol handshake further comprises:
generating, with the secure gateway device, a hash of protocol handshake parameters;
encrypting, with the secure gateway device, the hash using a private key corresponding to a public key of the first digital certificate; and
sending the encrypted hash from the secure gateway device to the first certificate-protected resource.

4. The method of claim 1, further comprising:
receiving the first digital certificate via a management interface of the secure gateway device;
storing the first digital certificate in the certificate repository of the secure gateway device;
receiving, with the secure gateway device, a policy rule that maps the identifier and the first certificate-protected resource to the first digital certificate; and
mapping the identifier and the first certificate-protected resource to the first digital certificate based on the policy rule.

5. The method of claim 4, wherein the policy rule maps a key comprising the identifier and a first certificate-protected resource identifier to the first digital certificate.

6. The method of claim 1, further comprising:
responsive to receiving the first message, authenticating the user.

7. The method of claim 6, further comprising
receiving, with the secure gateway device, a second message from the client device, wherein the second message comprises a request to access a second certificate-protected resource and the identifier;
determining, with the secure gateway device, that the user is currently authenticated;
mapping, with the secure gateway device, the identifier and the second certificate-protected resource to a second digital certificate; and
sending the second digital certificate from the secure gateway device to the second certificate-protected resource via the resource network to authenticate the secure gateway device to the second certificate-protected resource on behalf of the client device.

8. A secure gateway device that provides secure access to a resource network comprising a plurality of different certificate-protected resources, the secure gateway device comprising:
- a processor;
- a certificate repository to store a plurality of digital certificates, wherein the digital certificates are specific to individual ones of a plurality of different certificate-protected resources;
- a network interface to receive a first message from a client device coupled to the secure gateway device through an access network, wherein the first message comprises a request to access a first certificate-protected resource and an identifier for a user that is associated with the client device;
- a policy comprising one or more policy rules;
- an encryption module to initiate, in response to the first message, a protocol handshake with the first certificate-protected resource to establish a secure channel;
- a resource authentication module to map the identifier and the first certificate-protected resource to a first digital certificate stored by the certificate repository based at least on the policy,
- wherein the resource authentication module receives a certificate request from the first certificate-protected resource as part of the protocol handshake,
- wherein the resource authentication module, in response to the certificate request, retrieves the first digital certificate from the certificate repository and sends the first digital certificate to the first certificate-protected resource via the resource network to authenticate the secure gateway device to the first certificate-protected resource on behalf of the client device, and
- wherein, subsequent to authenticating to the first certificate-protected resource, the secure gateway device forwards application data received from the first certificate-protected resource to the client device via the access network.

9. The secure gateway of claim 8, wherein the secure channel comprises a secure sockets layer tunnel.

10. The secure gateway of claim 8,
- wherein the certificate repository additionally stores a private key corresponding to a public key of the first digital certificate,
- wherein the resource authentication module generates a hash of protocol handshake parameters as part of the protocol handshake,
- wherein the encryption module encrypts the hash using the private key as part of the protocol handshake, and
- wherein the resource authentication module sends the encrypted hash to the first certificate-protected resource as part of the protocol handshake.

11. The secure gateway of claim 8, further comprising:
- a management interface to:
  - receive the first digital certificate;
  - store the first digital certificate in the certificate repository;
  - receive a policy rule that maps the identifier and the first certificate-protected resource to the first digital certificate, and
  - add the policy rule to the policy, and
- wherein the resource authentication module maps the identifier and the first certificate-protected resource to the first digital certificate based on the policy rule.

12. The secure gateway of claim 8, further comprising a user authentication module to authenticate the user responsive to receiving the first message.

13. The secure gateway of claim 12,
- wherein the network interface receives a second message from the client device, wherein the second message comprises a request to access a second certificate-protected resource and an identifier for the requesting agent,
- wherein the user authentication module determines that the user is currently authenticated,
- wherein the resource authentication module maps the identifier and the second certificate-protected resource to a second digital certificate, and
- wherein the resource authentication module sends the second digital certificate to the second certificate-protected resource via the resource network to authenticate the secure gateway device to the second certificate-protected resource on behalf of the client device.

14. The secure gateway of claim 13,
- wherein the identifier maps to the first digital certificate and the second digital certificate stored by the certificate repository,
- wherein the first digital certificate authenticates the user to the first certificate-protected resource, and
- wherein the second digital certificate authenticates the user to the second certificate-protected resource.

15. A computer-readable storage medium comprising instructions for causing one or more programmable processors to:
- receive, with a secure gateway device that provides secure access to a resource network comprising a plurality of different certificate-protected resources, a first message from a client device coupled to the secure gateway device through an access network, wherein the first message comprises a request to access a first certificate-protected resource and an identifier for a user that is associated with the client device;
- initiate, in response to receiving the first message and by the secure gateway device, a protocol handshake between the secure gateway device and the first certificate-protected resource to establish a secure channel;
- map, with the secure gateway device, the identifier and the first certificate-protected resource specified within the request to a first digital certificate within a certificate repository of digital certificates of the secure gateway device, wherein the digital certificates stored within the repository of the secure gateway device are specific to individual ones of the plurality of different certificate-protected resources;
- receive, with the secure gateway device, a certificate request from the first certificate-protected resource as part of the protocol handshake;
- in response to the certificate request, send the first digital certificate from the secure gateway device to the first certificate-protected resource via the resource network to authenticate the secure gateway device to the first certificate-protected resource on behalf of the client device; and
- subsequent to authenticating the secure gateway device to the first certificate-protected resource, forward application data received from the first certificate-protected resource to the client device via the access network.

16. The computer-readable storage medium of claim 15, wherein the instructions further cause the one or more processors to:
- authenticate the requesting agent in response to receiving the first message;
- receive, with the secure gateway device, a second message from the client device, wherein the second message comprises a request to access a second certificate-protected resource and the identifier;
determine that the requesting agent is currently authenticated;
map, with the secure gateway device, the identifier and the second certificate-protected resource to a second digital certificate within the certificate repository; and
send the second digital certificate from the secure gateway device to the second certificate-protected resource.

* * * * *